Sept. 29, 1964 D. L. PHYFE 3,151,296

METHOD AND SYSTEM FOR TRANSMISSION OF COMPANDED PULSE CODE MODULATED INFORMATION

Filed Dec. 13, 1962

INVENTOR,
DOUGLAS L. PHYFE

BY Harry M. Saragovitz

ATTORNEY.

United States Patent Office 3,151,296

Patented Sept. 29, 1964

3,151,296

METHOD AND SYSTEM FOR TRANSMISSION OF COMPANDED PULSE CODE MODULATED INFORMATION

Douglas L. Phyfe, Ridgewood, N.J., assignor to the United States of America as represented by the Secretary of the Army Filed Dec. 13, 1962, Ser. No. 244,531

10 Claims. (Cl. 325—141)

(Granted under Title 35, U.S. Code (1952), sec. 266)

The invention described herein may be manufactured and used by or for the Government for governmental purposes, without the payment of any royalty thereon.

This invention relates to the transmission of information by quantized signals and more particularly to a method and system for the transmission of companded pulse code modulated information.

It has been the practice, for example, in delta pulse code modulation to code all difference voltages sampled to the nearest level available, thereby producing some error in the unmodulated signal at the receiver. It has also been the practice to utilize a linear distribution of these levels; i.e., evenly spaced levels, thereby approximating the larger difference voltages with a smaller percent error than the smaller difference voltages. However, if all samples were approximated with the same accuracy or even if the above situation were reversed; i.e., the smaller difference voltages were coded more accurately than were the large difference voltages, a more desirable signal-to-noise ratio would be produced. It has also been found that a majority of the samples taken of normal speech signals produced difference voltages which were relatively small. It would therefore seem desirable to code the smaller differences with the greatest accuracy so that the major portion of a speech signal will be more intelligible when received.

This result could be accomplished by spacing the available levels in some non-linear fashion, for example logarithmically, with the levels for the smaller difference voltages being spaced apart the smaller distances.

This non-linear spacing could of course be accomplished, for example, with non-linear amplifiers and the like. However, such elements beyond being costly and complex will add even more noise to the system, thereby decreasing the signal-to-noise ratio.

It is therefore an object of this invention to provide a method and system for companding ("compressing" the levels which represent small difference voltages and "expanding" the levels which represent large difference voltages) the coded difference levels in a delta pulse code modulation system.

Another object is to provide a companded delta pulse code modulation system wherein the signal-to-noise ratio is higher than has been attained in previous systems.

Still another object of this invention is to provide a delta pulse code modulation system which uses only linear elements.

Figure 1:
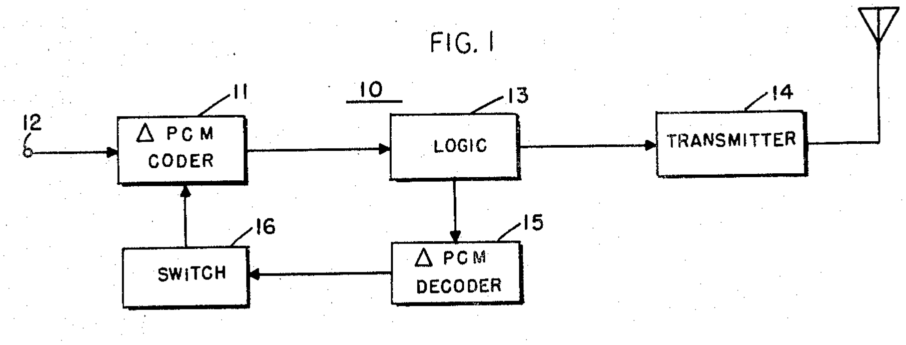
Figure 2:
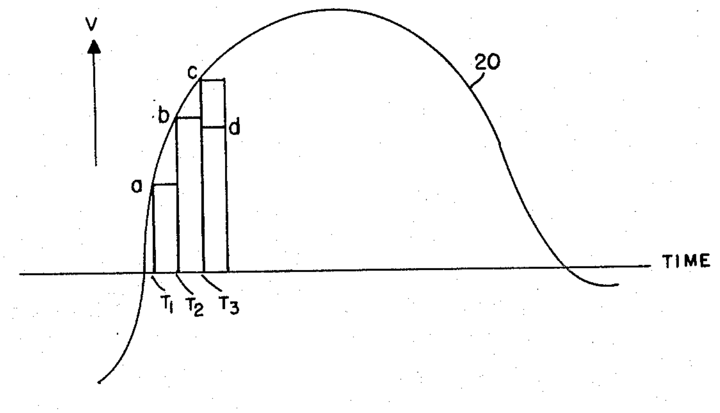

Other objects and many of the attendant advantages of this invention will be readily appreciated as the same becomes better understood by reference to the following detailed description and considered in connection with the accompanying drawings, wherein:

FIG. 1 shows the general block diagram of the system of the present invention; and FIG. 2 shows the general method used in quantizing the input signal of the device of FIG. 1.

Referring now to the drawings there is shown a companded delta pulse code modulation system 10 comprising a delta pulse code modulation coder (ΔPCM coder) 11 being fed by an analog input 12 such as a speech signal. ΔPCM coder 11 is coupled to a logic stage 13 which provides an input for a transmitter 14. A feedback loop, to provide a reference voltage, is provided from the logic stage 13 to the ΔPCM coder 11 and includes a ΔPCM decoder 15 and a switch 16.

The ΔPCM coder 11 is designed to code the difference voltage of the analog input signal at a higher bit per word than is to be transmitted by transmitter 14. The digital output of coder 11 is fed to logic 13 wherein this high bit per word is converted to the lower bit per word which the transmitter is capable of transmitting. This conversion in logic 13 is done in a non-linear fashion so that the difference voltages which are relatively small will have more levels at which to be coded than will be available for larger difference voltages.

This method may be better understood with reference to FIG. 2, wherein signal 20 represents the input analog speech voltage with respect to time. This voltage is sompled by the ΔPCM coder 11 at regular time intervals $T_1$, $T_2$ and $T_3$, in a well-known fashion, to determine the change in voltage between two time intervals. For example, voltage signal 20 has changed from voltage "$a$" to voltage "$b$" in the time interval $T_2-T_1$. This change in voltage $(b-a)$ is then approximated at the nearest available level and coded in coder 11 is binary form.

Let us assume that it is desirable to transmit a code having four bits per digital word. Coder 11 would then be designed to code the difference voltage $(b-a)$ using a large number of bits per digital word than four. Therefore, let us assume coder 11 is capable of coding the difference voltage by using eight bits per digital word thereby providing 256 linearly spaced levels. The first seven bits could be used for coding the value of the change in voltage $(b-a)$, while the eighth bit would be used to indicate whether the change was plus or minus. Under these conditions logic 13 would have to generate a four bit code upon the reception of an eight bit code from coder 11. Logic 13 would also have to discriminate between the 256 levels produced, in some non-linear fashion. An example of such a conversion is shown in the following table:

| Code | Extreme Levels of Each Group | No. of Levels in Each Group | Group No. | Four Bit Code |
|---|---|---|---|---|
| 11111111 | +127 | 80 | 1 | 1111 |
| 10110000 | +48 | | | |
| 10101111 | +47 | 24 | 2 | 1110 |
| 10011000 | +24 | | | |
| 10010111 | +23 | 12 | 3 | 1101 |
| 10001100 | +12 | | | |
| 10001011 | +11 | 6 | 4 | 1100 |
| 10000110 | +6 | | | |
| 10000101 | +5 | 3 | 5 | 1011 |
| 10000011 | +3 | | | |
| 10000010 | +2 | 1 | 6 | 1010 |
| 10000001 | +1 | 1 | 7 | 1001 |
| 00000000 | 0 | 1 | 8 | 0000 |
| 00000001 | −1 | 1 | 9 | 0001 |
| 00000010 | −2 | 1 | 10 | 0010 |
| 00000011 | −3 | 3 | 11 | 0011 |
| 00000101 | −5 | | | |
| 00000110 | −6 | 6 | 12 | 0100 |
| 00001011 | −11 | | | |
| 00001100 | −12 | 12 | 13 | 0101 |
| 00010111 | −23 | | | |
| 00011000 | −24 | 24 | 14 | 0110 |
| 00101111 | −47 | | | |
| 00110000 | −48 | 80 | 15 | 0111 |
| 01111111 | −127 | | | |

The left side of the table shows the non-linear grouping of the 255 levels into 15 different groups. As the levels get larger, both negative and positive, the number of levels in each group gets larger. For example, in Group 2 there are 24 levels ranging from level +24 to level +47. All difference voltages which are coded in this range when fed to logic 13 will generate in logic 13 the four bit code –1110–, corresponding to Group 2. It is this four bit code –1110– which will be transmitted by transmitter 14. When the difference voltage is smaller however, the number of levels in a group is smaller. For example, in Group 5 only three levels are represented, i.e., levels +3, +4 and +5. If the coder 11 should code the difference voltage (*b*—*a*) into one of these three levels logic 13 will generate code –1011–. It can therefore be generalized that as the difference voltage gets smaller the more accurate is the approximation to the correct voltage difference.

A logic circuit which could perform this function could be simply designed by a skilled engineer. For example, the logic circuit 13 may include a plurality of gates so arranged to convert the eight bit code into a four bit code in accordance with the groupings in the above table. For instance, if the combination of eight bits in the input to logic 13 falls within Group 1, that is, between levels +48 and +127 the four bit code could be generated as follows; the line which represents the seventh bit in the input could be connected directly to the three lines which represent the first three bits in the output so that all eight bit codes which have a pulse for the seventh bit will generate an output of –111– (the fourth bit will merely indicate polarity), also the lines which represent the fifth and sixth bits could be applied to an AND gate so that all eight bit codes which have a pulse for both the fifth and sixth bits would pass the AND gate, the output of which would be connected directly to the three lines which represent the first three bits in the output. It can therefore be seen that all codes in the input to logic 13 which represent a level of +48 or above will generate an output of –1111–. The remaining codes could be converted in the same manner as described for the codes in Group 1.

In order to provide a reference voltage from which coder 11 may measure the difference voltage, a feedback loop is provided. Normally the coder 11 will obtain a reference voltage, after measuring the difference (*b*—*a*), equal in magnitude to the voltage "*b*." This is usually done by charging a capacitor in coder 11 to a voltage equal to voltage "*b*." However, because of the approximation which is made in the coder 11 and again in logic 13 the receiver will not actually receive voltage "*b*" but rather some close approximation will be registered by adding the difference voltage, represented by the binary code transmitted, to the previously received voltage. It would therefore be desirable to alter the reference voltage in coder 11 to equal the voltage in the receiver to which the difference voltage is to be added. The feedback loop therefore contains a decoder 15 which will receive the four bit coded output from logic 13 and convert this code into a difference voltage which will be equal to the voltage received by the remote receiver. Switch 16 is synchronized with coder 11 and operates at the sampling frequency. The voltage difference received by decoder 15 will then pass through switch 16 to alter the reference voltage registered by coder 11.

With reference to FIG. 2 let it be assumed that the difference voltage (*b*—*a*) after being coded and transmitted is interpreted by the receiver as the difference (*d*—*a*) because of the approximation made in coder 11. Since this difference (*d*—*a*) is what is added to voltage "*a*" at the receiver it is desirable that the next difference voltage to be coded and transmitted be the difference (*c*—*d*). Since coder 11 contains the voltage "*b*" as its reference voltage the feedback circuit will be necessary to alter this reference voltage "*b*" to correspond to voltage "*d*."

Of course the reference voltage may be any voltage desirable so long as the decoder at the receiver knows what voltage is being used as the reference voltage. For example, the reference voltage may be some constant value and possibly equal to zero in which case the system would operate simply as a pulse code modulation system. In this case the feedback path of FIG. 1 could be eliminated and element 11 could be merely a pulse code modulation coder.

Obviously many other modifications and variations of the present invention are possible in the light of the above teachings. It is therefore to be understood that, within the scope of the appended claims, the invention may be practiced otherwise than as specifically described.

What is claimed is:

1. A method of companding pulse code modulated information comprising, converting an analog input signal to a first digital coded signal representing evenly spaced quantized levels, grouping said quantized levels into a plurality of groups in a non-linear fashion wherein the median groups contain fewer levels than the extreme groups, and converting said first digital coded signal into a second digital coded signal having fewer bits per digital word than said first digital signal and wherein the levels of said second digital signal each represent one of said plurality of groups.

2. A method of companding delta pulse code modulated information comprising, converting the quantized levels of difference voltages of an analog input signal to a first binary coded signal, converting said first binary coded signal directly to a second binary coded signal having less bits per digital word than said first binary signal and wherein the quantized levels represented by said second binary signal correspond to a fewer number of said quantized levels of said difference voltages near the median levels than near the extreme levels.

3. In a communication system, input means applying an analog input signal, coder means coupled to said input means sampling said input signal at equal time intervals and providing a first binary code representing an approximation of the voltage difference between a sample and the preceding sample, logic means converting non-linearly said first binary signal to a second binary signal having fewer bits per digital word, and transmitting means for transmitting said second binary signal.

4. A communication system according to claim 3 further comprising a feedback means including a decoder means converting said second binary signal into an analog reference signal and said decoder means supplying said coder means with said analog reference signal as a reference from which the subsequent sample is measured.

5. In a communication system, input means supplying an analog input signal, coder means coupled to said input means sampling said input signal at equal time intervals and providing a first binary code representing quantized levels of the voltage difference between a sample and the preceding sample, logic means converting non-linearly said first binary signal to a second binary signal having fewer bits per digital word and wherein the quantized levels represented by said second binary signal correspond to a fewer number of said quantized levels of said difference voltages near the median levels than near the extreme levels.

6. A communication system according to claim 5 further comprising a feedback means including a decoder means converting said second binary signal to an analog reference signal and said decoder means supplying said coder means with said analog reference signal as a reference from which the subsequent sample is measured.

7. In a communication system, input means supplying an analog input signal, coder means coupled to said input means sampling said input signal at equal time intervals and quantizing the difference in amplitude between a sample and a reference signal into equally spaced levels represented by a first binary code, logic means grouping non-linearly said equally spaced levels into a plurality of groups and generating a second binary code having fewer bits per digital word than said first binary signal, said second binary code representing a plurality of levels each of said last-mentioned levels corresponding to one of said plurality of groups, and means for transmitting said second binary signal.

8. A communication system as described in claim 7 wherein said reference signal is a constant.

9. A communication system as described in claim 7 wherein said reference signal is equal to the amplitude of the previous sample as represented by said second binary code.

10. A communication system as described in claim 9 and further including a feedback loop including a decoder means converting said second binary signal into an analog signal to be used as reference signal.

No references cited.